(12) United States Patent
Grey et al.

(10) Patent No.: US 7,256,149 B2
(45) Date of Patent: Aug. 14, 2007

(54) CATALYST REGENERATION PROCESS

(75) Inventors: Roger A. Grey, West Chester, PA (US); Mark P. Kaminsky, Media, PA (US)

(73) Assignee: Lyondell Chemical Technology, L.P., Greenville, DE (US)

( * ) Notice: Subject to any disclaimer, the term of this patent is extended or adjusted under 35 U.S.C. 154(b) by 300 days.

(21) Appl. No.: 10/785,455

(22) Filed: Feb. 24, 2004

(65) Prior Publication Data

US 2005/0187095 A1   Aug. 25, 2005

(51) Int. Cl.
*B01J 20/34* (2006.01)

(52) U.S. Cl. ...................................................... 502/38

(58) Field of Classification Search ................. 502/50, 502/38
See application file for complete search history.

(56) References Cited

U.S. PATENT DOCUMENTS

| | | | | |
|---|---|---|---|---|
| 3,351,635 A | | 11/1967 | Kollar ..................... | 260/348.5 |
| 4,367,342 A | | 1/1983 | Wulff et al. ................ | 549/529 |
| 4,833,260 A | | 5/1989 | Neri et al. .................. | 549/531 |
| 5,798,313 A | * | 8/1998 | Carroll et al. ............... | 502/38 |
| 5,859,265 A | | 1/1999 | Muller et al. ............... | 549/531 |
| 5,916,835 A | * | 6/1999 | Carroll et al. ............... | 502/29 |
| 5,965,754 A | * | 10/1999 | Clark et al. ................. | 549/533 |
| 6,008,388 A | | 12/1999 | Dessau et al. .............. | 549/531 |
| 6,310,224 B1 | * | 10/2001 | Grey .......................... | 549/523 |
| 6,380,119 B1 | | 4/2002 | Grosch et al. ............... | 502/49 |
| 6,403,815 B1 | * | 6/2002 | Grey .......................... | 549/532 |
| 6,441,203 B1 | * | 8/2002 | Grey .......................... | 549/533 |
| 6,441,204 B1 | * | 8/2002 | Grey .......................... | 549/533 |
| 6,498,259 B1 | * | 12/2002 | Grey et al. ................. | 549/533 |
| 6,916,756 B2 | * | 7/2005 | Schindler et al. ............ | 502/38 |

FOREIGN PATENT DOCUMENTS

BE   1001038 A7   6/1989
JP   4-352771   12/1992

OTHER PUBLICATIONS

A. Baiker, *App. Catal. A: General 208* (2001) 125.
G. Thiele, *Journal of Molecular Catalyst A: Chemical 117* (1997) 351.

* cited by examiner

*Primary Examiner*—Edward M. Johnson
(74) *Attorney, Agent, or Firm*—Kevin M. Carroll

(57) ABSTRACT

Used noble metal-containing titanium zeolite catalysts, that have been employed in the liquid-phase epoxidation of olefins with hydrogen and oxygen in the presence of a buffer, are regenerated by heating the used catalyst at a temperature of at least 250° C. in the presence of a oxygen-containing gas stream, followed by reduction at a temperature of at least 20° C. in the presence of a hydrogen-containing gas stream to form a reactivated catalyst.

18 Claims, No Drawings

CATALYST REGENERATION PROCESS

FIELD OF THE INVENTION

This invention relates to a method for restoring the activity of a noble metal-containing titanium zeolite catalyst that has been used to catalyze the epoxidation of olefins with hydrogen and oxygen, where the olefin epoxidation is performed in a reaction solvent that contains a buffer. Regeneration is accomplished by heating the spent noble metal-containing titanium zeolite catalyst in the presence of a gas stream comprised of oxygen, followed by reduction of the spent catalyst in the presence of a gas stream comprised of hydrogen.

BACKGROUND OF THE INVENTION

Many different methods for the preparation of epoxides have been developed. Generally, epoxides are formed by the reaction of an olefin with an oxidizing agent in the presence of a catalyst. The production of propylene oxide from propylene and an organic hydroperoxide oxidizing agent, such as ethyl benzene hydroperoxide or tert-butyl hydroperoxide, is commercially practiced technology. This process is performed in the presence of a solubilized molybdenum catalyst, see U.S. Pat. No. 3,351,635, or a heterogeneous titania on silica catalyst, see U.S. Pat. No. 4,367,342. Hydrogen peroxide is another oxidizing agent useful for the preparation of epoxides. Olefin epoxidation using hydrogen peroxide and a titanium silicate zeolite is demonstrated in U.S. Pat. No. 4,833,260. One disadvantage of both of these processes is the need to pre-form the oxidizing agent prior to reaction with olefin.

Another commercially practiced technology is the direct epoxidation of ethylene to ethylene oxide by reaction with oxygen over a silver catalyst. Unfortunately, the silver catalyst has not proved useful in commercial epoxidation of higher olefins. Therefore, much current research has focused on the direct epoxidation of higher olefins with oxygen and hydrogen in the presence of a catalyst. In this process, it is believed that oxygen and hydrogen react in situ to form an oxidizing agent. Thus, development of an efficient process (and catalyst) promises less expensive technology compared to the commercial technologies that employ pre-formed oxidizing agents.

Many different catalysts have been proposed for use in the direct epoxidation of higher olefins. For example, JP 4-352771 and U.S. Pat. Nos. 5,859,265 and 6,008,388 disclose the production of propylene oxide from the reaction of propylene, oxygen, and hydrogen using a catalyst containing a Group VIII metal such as palladium on a crystalline titanosilicate.

Unfortunately, catalysts of the type disclosed above tend to slowly deteriorate in performance when used repeatedly or in a continuous process for a prolonged period of time. In particular, the catalyst activity decreases with time to a point where continued use of the catalyst charge is no longer economically viable. Due to the relatively high cost of synthesizing this type of catalyst, regeneration of the used catalyst would be greatly preferred over replacement.

U.S. Pat. No. 6,380,119 discloses a method of regenerating a zeolite, particularly a titanium silicalite, by a three-stage calcination process in which the temperature is varied from 250-800° C. and the oxygen content is varied over the three stages. Baiker et al., *App. Catal. A: General* 208 (2001) 125, discloses the washing of a used Pd—Pt/TS-1 catalyst to partially remove non-volatile organic residue from the catalyst. In addition, Baiker speculates that reactivation of the Pd—Pt/TS-1 catalyst requires an oxidative treatment at elevated temperatures, but that earlier work indicates that such a treatment would result in reduced catalytic performance. U.S. Pat. No. 5,859,265 also states that a palladium titanium silicalite catalyst may be regenerated by either a simple wash process or by a controlled burn at 350° C. followed by reduction.

As with any chemical process, it is desirable to develop new and improved regeneration methods. We have discovered an effective regeneration method to restore the activity of a used noble metal-containing titanium zeolite catalyst.

SUMMARY OF THE INVENTION

The invention provides a method of regenerating a used noble metal-containing titanium zeolite catalyst that has been employed in the epoxidation of olefins in the presence of hydrogen and oxygen, where the olefin epoxidation is performed in a reaction solvent that contains a buffer. The regeneration method comprises heating the used catalyst at a temperature of at least 250° C. in the presence of an oxygen-containing gas stream, followed by reducing the heated used catalyst at a temperature of at least 20° C. in the presence of an hydrogen-containing gas stream to form the reactivated catalyst. We surprisingly found that the calcination and reduction regeneration of catalysts used to epoxidize olefins with hydrogen and oxygen in the presence of a buffer results in unexpectedly low propane selectivity in propylene epoxidation.

DETAILED DESCRIPTION OF THE INVENTION

The catalysts regenerable by practice of the present invention are noble metal-containing titanium zeolite catalysts. Noble metal-containing titanium zeolite catalysts are well known in the art and are described, for example, in JP 4-352771 and U.S. Pat. Nos. 5,859,265 and 6,008,388, the teachings of which are incorporated herein by reference in their entirety. Such catalysts typically comprise a titanium zeolite and a noble metal, such as palladium, gold, platinum, silver, iridium, ruthenium, osmium, or combinations thereof. The catalysts may contain a mixture of noble metals. Preferred catalysts comprise palladium and a titanium zeolite, palladium, gold, and a titanium zeolite, or palladium, platinum, and titanium zeolite.

Titanium zeolites comprise the class of zeolitic substances wherein titanium atoms are substituted for a portion of the silicon atoms in the lattice framework of a molecular sieve. Such substances are well known in the art. Particularly preferred titanium zeolites include the class of molecular sieves commonly referred to as titanium silicalites, particularly "TS-1" (having an MFI topology analogous to that of the ZSM-5 aluminosilicate zeolites), "TS-2" (having an MEL topology analogous to that of the ZSM-11 aluminosilicate zeolites), and "TS-3" (as described in Belgian Pat. No. 1,001,038). Titanium-containing molecular sieves having framework structures isomorphous to zeolite beta, mordenite, ZSM-48, ZSM-12, and MCM-41 are also suitable for use. The titanium zeolites preferably contain no elements other than titanium, silicon, and oxygen in the lattice framework, although minor amounts of boron, iron, aluminum, sodium, potassium, copper and the like may be present.

The typical amount of noble metal present in the noble metal-containing titanium zeolite will be in the range of from about 0.001 to 20 weight percent, preferably 0.005 to 10 weight percent, and particularly 0.01 to 5 weight percent. The manner in which the noble metal is incorporated into the catalyst is not considered to be particularly critical. For example, the noble metal may be supported on the zeolite by impregnation or the like. Alternatively, the noble metal can be incorporated into the zeolite by ion-exchange with, for example, tetraammine palladium dichloride.

There are no particular restrictions regarding the choice of noble metal compound used as the source of noble metal. For example, suitable compounds include the nitrates, sulfates, halides (e.g., chlorides, bromides), carboxylates (e.g. acetate), and amine complexes of the noble metal. The noble metal may be in an oxidation state anywhere from 0 to +4 or any combination of such oxidation states. To achieve the desired oxidation state or combination of oxidation states, the noble metal compound may be calcined, reduced, or a combination thereof. Satisfactory catalytic performance can, however, be attained without any pre-reduction. To achieve the active state of noble metal, the noble metal-containing titanium zeolite may undergo pretreatment such as thermal treatment in nitrogen, vacuum, hydrogen, or air.

The noble metal-containing titanium zeolite catalyst may also comprise a palladium-containing titanium zeolite and a palladium-free titanium zeolite. The palladium-free titanium zeolite is a titanium-containing molecular sieve that is free of added palladium. The addition of a palladium-free titanium zeolite has proven beneficial to productivity of the palladium that is present in the catalyst.

The noble metal-containing titanium zeolite may be used in the epoxidation process as a powder, a pellet, or a large particle size solid produced by a process such as spray drying. In addition, the noble metal-containing titanium zeolite may also be pelletized or extruded prior to use in epoxidation. If pelletized or extruded, the catalyst may additionally comprise a binder or the like and may be molded, spray dried, shaped or extruded into any desired form prior to use in epoxidation.

The noble metal-containing titanium zeolite catalysts are useful for catalyzing the epoxidation of olefins with oxygen and hydrogen. This epoxidation process comprises contacting an olefin, oxygen, and hydrogen in a liquid medium in the presence of the catalyst. Suitable olefins include any olefin having at least one carbon-carbon double bond, and generally from 2 to 60 carbon atoms. Preferably the olefin is an acyclic alkene of from 2 to 30 carbon atoms; the process of the invention is particularly suitable for epoxidizing $C_2$-$C_6$ olefins. More than one double bond may be present, as in a diene or triene for example. The olefin may be a hydrocarbon (i.e., contain only carbon and hydrogen atoms) or may contain functional groups such as halide, carboxyl, hydroxyl, ether, carbonyl, cyano, or nitro groups, or the like. The process of the invention is especially useful for converting propylene to propylene oxide.

Oxygen and hydrogen are also required for the epoxidation process. Although any sources of oxygen and hydrogen are suitable, molecular oxygen and molecular hydrogen are preferred.

The epoxidation reaction is carried out at a temperature effective to achieve the desired olefin epoxidation, preferably at temperatures in the range of 0-250° C., more preferably, 20-100° C. The molar ratio of hydrogen to oxygen can usually be varied in the range of $H_2$:$O_2$=1:10 to 5:1 and is especially favorable at 1:5 to 2:1. The molar ratio of oxygen to olefin is usually 2:1 to 1:20, and preferably 1:1 to 1:10. Relatively high oxygen to olefin molar ratios (e.g., 1:1 to 1:3) may be advantageous for certain olefins. A carrier gas may also be used in the epoxidation process in addition to olefin, hydrogen, and oxygen. As the carrier gas, any desired inert gas can be used. The molar ratio of olefin to carrier gas is then usually in the range of 100:1 to 1:10 and especially 20:1 to 1:10.

As the inert gas carrier, noble gases such as helium, neon, and argon are suitable in addition to nitrogen and carbon dioxide. Saturated hydrocarbons with 1-8, especially 1-6, and preferably with 1-4 carbon atoms, e.g., methane, ethane, propane, and n-butane, are also suitable. Nitrogen and saturated $C_1$-$C_4$ hydrocarbons are the preferred inert carrier gases. Mixtures of the listed inert carrier gases can also be used.

Specifically in the epoxidation of propylene, propane can be supplied in such a way that, in the presence of an appropriate excess of carrier gas, the explosive limits of mixtures of propylene, propane, hydrogen, and oxygen are safely avoided and thus no explosive mixture can form in the reactor or in the feed and discharge lines.

The amount of catalyst used and the time required for the epoxidation may be determined on the basis of the gas hourly space velocity, i.e., the total volume of olefin, hydrogen, oxygen and carrier gas(es) per unit hour per unit of catalyst volume (abbreviated GHSV). A GHSV in the range of 10 to 10,000 $hr^{-1}$ is typically satisfactory.

The epoxidation reaction is carried out in a liquid medium. It is advantageous to work at a pressure of 1-100 bars and in the presence of one or more solvents. Suitable reaction solvents include, but are not limited to, alcohols, water, supercritical $CO_2$, or mixtures thereof. Suitable alcohols include $C_1$-$C_4$ alcohols such as methanol, ethanol, isopropanol, and tert-butanol, or mixtures thereof. Fluorinated alcohols can be used. It is preferable to use mixtures of the cited alcohols with water. For the liquid-phase epoxidation process, the catalyst is preferably in the form of a suspension or fixed-bed. The process may be performed using a continuous flow, semi-batch or batch mode of operation.

The olefin epoxidation reaction of the invention requires the use of a buffer. The buffer will typically be added to the solvent to form a buffer solution in order to inhibit the ring opening of epoxides to glycols and/or glycol ethers. Buffers are well known in the art. Buffers useful in this invention include any suitable salts of oxyacids, the nature and proportions of which in the mixture, are such that the pH of their solutions may range from 3 to 10, preferably from 4 to 9 and more preferably from 5 to 8. Suitable salts of oxyacids contain an anion and cation. The anion portion of the salt may include anions such as phosphate, carbonate, bicarbonate, carboxylates (e.g., acetate, phthalate, and the like), citrate, borate, hydroxide, silicate, aluminosilicate, or the like. The cation portion of the salt may include cations such as ammonium, alkylammoniums (e.g., tetraalkylammoniums, pyridiniums, and the like), alkali metals, alkaline earth metals, or the like. Cation examples include $NH_4$, $NBu_4$, $NMe_4$, Li, Na, K, Cs, Mg, and Ca cations. More preferred buffers include alkali metal phosphate and ammonium phosphate buffers. Buffers may preferably contain a combination of more than one suitable salt. Typically, the concentration of buffer in the solvent is from about 0.0001 M to about 1 M, preferably from about 0.001 M to about 0.3 M. The buffer useful in this invention may also include the addition of ammonia gas to the reaction system.

Obviously, there is no need to utilize the regeneration process of this invention until the epoxidation activity of the catalyst has diminished to an unacceptable level. Typically, however, it will be economically desirable to reactivate the catalyst when its activity is between 0.1 and 50 percent of its activity when freshly prepared, as measured by the rate at which epoxide and derivatives (such as glycols and glycol ethers) are formed. The length of time between the start of epoxidation and the point at which catalyst activity drops to a level where regeneration is to be initiated will be dependent upon many reaction parameters, including the identities of the olefin, the solvent, the space velocities of the reactants, the reaction temperature, and the nature and amount of impurities and other changes in the catalyst associated with deactivation.

The spent noble metal-containing titanium zeolite catalyst is preferably separated in solid form from any liquid components of the reaction mixture in which it may be present prior to regeneration. For example, where the catalyst has been deployed in the form of a slurry, it may be readily collected by filtration, centrifugation, decantation, or other such mechanical means and then transferred into a vessel which is suitable for carrying out the regeneration. Alternatively, where the catalyst has been used as a fixed bed, the liquid components may be simply drained or pumped away from the spent catalyst and regeneration conducted in the same vessel as the catalytic process. If this embodiment of the regeneration process is practiced, however, the vessel employed should be constructed of materials capable of withstanding the high temperatures encountered during the regeneration. Of course, a fixed bed catalyst could also be transferred to a different vessel for regeneration purposes. It is not, however, necessary to completely dry the recovered catalyst prior to regeneration since any minor amounts of epoxidation reaction solvent, reactants, and the like adsorbed on the catalyst can be readily removed and disposed of during such regeneration. If so desired, the spent catalyst may be subjected to an initial drying step at a relatively low temperature in order to remove any volatile components present. For example, a gas stream comprised of oxygen, an inert gas, air or a mixture thereof may be passed through a fixed bed of the spent catalyst at a temperature in the range 25° C. to 200° C. The catalyst may also be exposed to subatmospheric pressure (preferably at elevated temperatures) in order to facilitate the removal of volatile substances associated with the catalyst.

The spent catalyst is preferably washed with a wash solvent prior to the regeneration procedure. Suitable wash solvents include water, alcohols, ketones, ethers, furans, nitrites, esters, aromatic hydrocarbons, and mixtures thereof to remove substances adhering to the catalyst prior regeneration. Preferred solvents include water, $C_1$-$C_{10}$ aliphatic alcohols, $C_7$-$C_{12}$ aralkyl alcohols, $C_3$-$C_{20}$ hydrocarbons, or the like. Any conventional catalyst washing procedure is suitable. The washed catalyst may optionally be dried prior to the regeneration procedure.

The spent noble metal containing titanium zeolite catalyst is heated in the presence of molecular oxygen at a temperature of at least 250° C., but preferably at least 300° C. Preferably, the temperature should be less than 850° C. The temperature range of from 300° C. to 450° C. is especially suitable. In one embodiment of the invention, the gas stream containing oxygen is passed over the spent catalyst while the temperature (which initially may be at a relatively low temperature) is slowly elevated to a final temperature in excess of 250° C. The temperature may be kept constant during regeneration or may be periodically or continuously increased or decreased as desired. The molecular oxygen may be combined with other gases such as nitrogen and the like; air may also be used as the source of oxygen. The percent molecular oxygen in the gas stream should be selected so that excessive or uncontrollable exotherms are not produced. Typically, the gas stream will comprise from about 1 to 30 volume percent oxygen. The process may be conducted such that a gas stream comprising molecular oxygen is passed over the spent catalyst in order to sweep away any volatile products evolved from the catalyst. Gas flow rates of 1 to 100 liters per kilogram of catalyst per minute will typically prove satisfactory. Alternatively, the regeneration may be performed in a static manner. The catalyst could also be agitated or stirred while being contacted with the oxygen-containing gas. The use of a rotary kiln is especially advantageous.

The catalyst is heated for such time as may be necessary to restore the desired level of activity and selectivity. Typical heating times are from 0.1 to 48 hours. The optimum time will vary somewhat depending upon the extent to which the catalyst has been deactivated, the type of olefin used in epoxidation, as well as other factors, but may be readily ascertained by routine experimentation.

In yet another variation of the process, the spent catalyst may be first heated to 250° C. or higher in the absence of oxygen to convert the organic impurities on the catalyst to carbon, then exposed to oxygen to burn off the carbon.

After heating the spent catalyst to at least 250° C. in the presence of an oxygen-containing gas stream, the used catalyst is then reduced at a temperature of at least 20° C. in the presence of molecular hydrogen, but preferably at least 30° C. The temperature range of from 40° C. to 60° C. is especially suitable. In one embodiment of the invention, the gas stream containing hydrogen is passed over the spent catalyst while the temperature (which initially may be at a relatively low temperature) is slowly elevated to a final temperature in excess of 20° C. The temperature may be kept constant during reduction or may be periodically or continuously increased or decreased as desired. The molecular hydrogen may be combined with other gases such as nitrogen and the like. The percent molecular hydrogen in the gas stream should be selected so that excessive or uncontrollable exotherms are not produced. Typically, the gas stream will comprise from about 1 to 30 volume percent hydrogen, preferably from about 1 to 4 volume percent hydrogen. The process may be conducted such that a gas stream comprising molecular hydrogen is passed over the spent catalyst. Gas flow rates of 1 to 100 liters per kilogram of catalyst per minute will typically prove satisfactory. Alternatively, the reduction may be performed in a static manner. The catalyst could also be agitated or stirred while being contacted with the hydrogen-containing gas.

The catalyst is reduced for such time as may be necessary to restore the desired level of activity and selectivity. Typical heating times are from 0.1 to 48 hours. The optimum time will vary somewhat depending upon the extent to which the catalyst has been deactivated, the type of olefin used in epoxidation, as well as other factors, but may be readily ascertained by routine experimentation.

The regenerated catalyst which has been reactivated in accordance with the process of the invention may be admixed with freshly prepared catalyst prior to reuse, if so desired, or used directly.

The following examples merely illustrate the invention. Those skilled in the art will recognize many variations that are within the spirit of the invention and scope of the claims.

EXAMPLE 1

Catalyst Preparation

Catalyst 1A: Spray dried TS-1 (160 g, 80% TS-1, silica binder, 1.74 wt. % Ti, calcined at 550° C. in air) is slurried in deionized water (400 g) and the pH is adjusted to 7.0 using 3 wt. % aqueous ammonium hydroxide. After mixing for 5 minutes, an aqueous solution of tetra ammine palladium dinitrate (3.36 g aqueous solution containing 5.37 wt. % Pd, further diluted with 29.44 g of deionized water) is added with mixing over 5 minutes. The pH is then adjusted to 7.5 with 3 wt. % aqueous ammonium hydroxide and the slurry is agitated at 30° C. for 1 hour. The slurry is filtered and the filter cake is washed three times by reslurrying in deionized water (240 g) and filtering again. The solids are then air dried overnight and dried in a vacuum oven at 50° C. for 6 hours. The dried solid contains 0.1 wt. % Pd and 1.74 wt. % Ti.

The dried solids are oven calcined in air by heating from 23 to 110° C. at 10° C./min and holding at 110° C. for 4 hours, then heating to 300° C. at 2° C./min and holding at 300° C. for 4 hours. The calcined solids are then transferred to a quartz tube, heated to 50° C. and treated with 5 vol. % hydrogen in nitrogen (100 cc/min) for 4 hours. After the hydrogen treatment, nitrogen is passed through the solids for 1 hour before cooling to 23° C. and recovering Catalyst 1A.

Catalyst 1B: Spray dried TS-1 (112 g, 80% TS-1, silica binder, 1.6 wt. % Ti, calcined at 550° C.) is slurried in deionized water (250 g). Tetra ammine palladium dichloride monohydrate (0.4325 g, dissolved in 90 g of deionized water) is added with mixing over 30 minutes at 20° C. The slurry is filtered and the filter cake is washed four times by reslurrying in deionized water (400 g) and filtering again. The solids are then air dried overnight and dried in a vacuum oven at 50° C. for 16 hours. The dried solid contains 0.13 wt. % Pd and 1.69 wt. % Ti.

The dried solids are oven calcined in air by heating from 23 to 110° C. at 10° C./min and holding at 110° C. for 4 hours, then heating to 150° C. at 2° C./min and holding at 150° C. for 4 hours.

A solution of hydrogen tetrachloroaurate is formed by heating deionized water (1575 g) to 70° C. and adding hydrogen tetrachloroaurate (0.1 g), then adjusting the pH from 2.8 to 7.3 with a 5 wt. % solution of cesium hydroxide. The Pd/TS-1 solid formed above (100 g) is added to the entire hydrogen tetrachloroaurate solution and the pH is then adjusted from 3.9 to 7.0 using a 5 wt. % cesium hydroxide solution. The reaction mixture is then mixed at 80° C. for 24 hours under a nitrogen atmosphere. The solids are isolated by pressure filtration using nitrogen at about 80 psig and are then dried in a vacuum oven at 50° C. for 18 hours. The dried material contains 0.13 wt. % Pd, 0.02 wt. % Au, and 1.69 wt. % Ti.

The dried solids are transferred to a quartz tube, heated to 50° C. and treated with 5 vol. % hydrogen in nitrogen (100 cc/min) for 4 hours. After the hydrogen treatment, nitrogen is passed through the solids for 1 hour before cooling to 23° C. and recovering Catalyst 1 B.

Catalyst 1C: Spray dried TS-1 (112 g, 80% TS-1, silica binder, 1.6 wt. % Ti, calcined at 550° C.) is slurried in deionized water (250 g). Tetra ammine palladium dichloride monohydrate (1.3 g, dissolved in 90 g of deionized water) is added with mixing over 30 minutes at 20° C., and the round bottom flask containing the slurry is turned at about 30 rpm in a 30° C. water bath for 2 hours. The slurry is filtered and the filter cake washed four times by reslurrying in deionized water (140 g) and filtering again. The solids are then air dried overnight and dried in a vacuum oven at 50° C. for 6 hours to give a constant weight. The dried material contains 0.31 wt. % Pd and 1.63 wt. % Ti.

The dried solids are oven calcined in air by heating from 23 to 110° C. at 10° C./min and holding at 110° C. for 4 hours, then heating to 150° C. at 2° C./min and holding at 150° C. for 4 hours. The calcined solids are then transferred to a quartz tube, heated to 50° C. and treated with 5 vol. % hydrogen in nitrogen (100 cc/min) for 4 hours. After the hydrogen treatment, nitrogen is passed through the solids for 1 hour before cooling to 23° C. and recovering Pd/TS-1 solid.

The Pd/TS-1 solid (15 g) is then combined with the spray dried TS-1 (25 g) used in the Pd/TS-1 preparation to form Catalyst 1C.

Catalyst 1 D: Catalyst 1 D is prepared according to the same procedure as Catalyst 1 B, except that 336 g of spray dried TS-1 (1.8 wt. % Ti) is slurried in 754 g of deionized water, 3.9 g of tetra ammine palladium dichloride monohydrate is used, the Pd/TS-1 solid is washed four times with 527 g (in place of 400 g) of deionized water, and 0.3 g of hydrogen tetrachloroaurate is used. Catalyst 1D contains 0.3 wt. % Pd, 0.08 wt. % Au, and 1.8 wt. % Ti.

EXAMPLE 2

Propylene Epoxidation Procedure

Runs 2A, 2B, and 2D: Catalysts 1A, 1B, and 1D are run in propylene epoxidation according to the following general procedure. A 1-liter stainless steel reactor is charged with fresh catalyst (60 g), deionized water (150 g), and methanol (450 g). A solvent pump is charged with a mixture of methanol/water (77/23 wt. %) and an ISCO pump is charged with aqueous solution of ammonium phosphate prepared by adding ammonium hydroxide to an aqueous solution of ammonium dihydrogen phosphate to a specified pH. The reactor is then pressurized to 500 psig with a feed consisting of 3.9% hydrogen, 4.1% oxygen, 3.5 or 9% propylene, 0.5% methane and the balance nitrogen (volume %). Combined gas flow rates are 460 or 510 standard liters/hr. Solvent and the ammonium phosphate solution are flowed continuously through the reactor at a rate of 100 mL/hr and 2 mL/hr, respectively. The reactor pressure is maintained at 500 psig via a back pressure regulator and liquid level is controlled with a research control valve. The reactor is stirred at 500 rpm. The reactor contains a dip tube equipped with a 7 micron filter to remove the liquids and retain the solid catalyst in the reactor while the fed gases are removed overhead. The reaction mixture is heated to 60° C. and the gaseous effluent and liquid phase are analyzed by an online gas chromatography (GC).

After several weeks of operation the used catalyst is recovered from the reactor, washed with deionized water, and vacuum dried at 50° C.

Run 2A uses Catalyst 1A, with a 7.2 pH ammonium phosphate solution, 9% propylene, and gas flow rate of 510 L/hr. The recovered catalyst is used Catalyst 2A.

Run 2B uses Catalyst 1 B, with a 6 pH ammonium phosphate solution, 3.5% propylene, and combined gas flow rate of 460 L/hr. The recovered catalyst is used Catalyst 2B.

Run 2D uses Catalyst 1 D, with a 6 pH ammonium phosphate solution, 3.5% propylene, and combined gas flow rate of 460 L/hr. The recovered catalyst is used Catalyst 2D.

Run 2C: A 1-liter stainless steel reactor is charged with Catalyst 1C (15 g of fresh Pd/TS-1; 25 g of TS-1). An ammonium phosphate solution is prepared by adding ammonium hydroxide to an aqueous solution of ammonium dihydrogen phosphate to a pH of 6 and then combining with methanol (three times the weight of the aqueous solution). The reactor is charged with the ammonium phosphate solution (600 g) and a solvent pump is also charged with the ammonium phosphate solution. The reactor is then pressurized to 500 psig with a feed consisting of 3.5% hydrogen, 3.5% oxygen, 5% propylene, 0.5% methane and the balance nitrogen (volume %). Combined gas flow rates are 406 standard liters/hr. The reactor pressure is maintained at 500 psig via a back pressure regulator and liquid level is controlled with a research control valve. The reactor is stirred at 500 rpm. The reactor contains a dip tube equipped with a 7 micron filter to remove the liquids and retain the solid catalyst in the reactor while the fed gases are removed overhead. The reaction mixture is heated to 60° C. and the solvent is pumped to the reactor at 200 g/hr. The gaseous effluent and liquid phase are analyzed by an online gas chromatography (GC).

After several weeks of operation the used catalyst is recovered from the reactor, washed with deionized water, and vacuum dried at 50° C. to give used Catalyst 2C.

EXAMPLE 3

Catalyst Regeneration by Calcination and Reduction

Regeneration 3A: Used Catalyst 2A (3.48 g) from Run 2A is placed in a muffle furnace purged with dry air at 1 L/min. The used catalyst is heated from 22° C. to 110° C. at 5° C./min and held for 4 hours, then heated from 110° C. to 350° C. at 2° C./min and held for 8 hours before cooling. The carbon content of the used catalyst dropped from 2.6 wt. % to <0.1 wt. %. The Pd content measured at 0.1 wt. % and phosphorus (as phosphate) measured at 0.04 wt. %.

The calcined solids are then transferred to a quartz tube, heated to 50° C. and treated with 5 vol. % hydrogen in nitrogen (100 cc/min) for 4 hours. After hydrogen treatment, nitrogen is passed through the solids for 1 hour before cooling to 23° C. and collecting regenerated Catalyst 3A.

Regeneration 3B: Used Catalyst 2B (2 g) from Run 2B is regenerated according to the procedure of Regeneration 3A. The carbon content of the used catalyst dropped from 3.4 wt. % to <0.1 wt. %. The Pd content measured at 0.1 wt. %, the Au content measured at 0.02 wt. %, and phosphorus (as phosphate) measured at 0.13 wt. %.

The calcined solids are then reduced according to the same procedure used for Regeneration 3A, giving regenerated Catalyst 3B.

Regeneration 3C: Used Catalyst 2C (7 g) from Run 2C is regenerated according to the procedure of Regeneration 3A, except that the muffle furnace is purged with 4% oxygen in nitrogen at a rate of about 1 L/min. The carbon content of the used catalyst dropped from 3.9 wt. % to 0.32 wt. %. The Pd content measured at 0.054 wt. % and phosphorus (as phosphate) measured at 0.31 wt. %.

Half of the calcined solids (Catalyst 3C-1) are recovered for comparative testing in epoxidation, and the other half of the calcined solids are reduced according to the same procedure used for Regeneration 3A, giving regenerated Catalyst 3C-2.

Regeneration 3D: Used Catalyst 2D (2 g) from Run 2D is regenerated according to the procedure of Regeneration 3A, except that the muffle furnace is heated from 110° C. to 350° C. at a rate of 0.66° C./min. The Pd content measured at 0.24 wt. %, Au at 0.07 wt. %, phosphorus (as phosphate) measured at 0.16 wt. %, and the carbon content measured at <0.1 wt. %.

The calcined solids are then reduced according to the same procedure used for Regeneration 3A, giving regenerated Catalyst 3D.

COMPARATIVE EXAMPLE 4

Catalyst Regeneration by Washing

Comparative Regeneration 4A: Used Catalyst 2A (2 g) from Run 2A is placed in a 125 ml stainless steel Parr reactor containing a Teflon stir bar, deionized water (40 g), and pure methanol (32 g). The reactor is sealed, pressured/depressured with pure nitrogen several times to remove residual air, then brought up to about 100 psig in nitrogen while stirring the liquid slurry at about 300 rpm. The reactor is heated to 150° C. which raised the pressure to 185-215 psig for 24 hours, then cooled to room temperature before venting to 1 atmosphere. The washed, regenerated catalyst is then rinsed from the reactor onto a 0.22 micron Millipore filter and rinsed several times with deionized water. The catalyst is air dried for several hours before placing in a vacuum oven at 85° C., and evacuated to 25-30" water for 4 hours. The carbon content of the regenerated Catalyst 4A dropped from 2.6 wt. % to 0.38 wt. %. The Pd content measured at 0.1 wt. % and phosphorus (as phosphate) measured at 0.02 wt. %.

Comparative Regeneration 4B: Used Catalyst 2B (2 g) from Run 2B is regenerated according to the procedure of Comparative Regeneration 4A, except that 33.1 g of methanol is used, the reactor pressure is raised to 220 psig upon heating, the regenerated catalyst is collected on a 0.45 micron Millipore filter, and then vacuum dried at 60° C. The carbon content of the regenerated Catalyst 4B dropped from 3.4 wt. % to 1.43 wt. %. The Pd content measured at 0.11 wt. %, the Au content measured at 0.02 wt. %, and phosphorus (as phosphate) measured at 0.03 wt. %.

Comparative Regeneration 4C: Used Catalyst 2C (1.83 g) from Run 2C is regenerated by pure methanol wash using a Soxhlet extractor. The used catalyst is transferred to a paper Soxhlet extraction thimble and placed in the Soxhlet extraction head. Methanol (75 mL) is added with a few boiling chips to a glass round bottom flask. The Soxhlet extraction head is attached to a 100 mL round bottom flask containing methanol (75 mL) and a few boiling chips. A slight nitrogen purge is flowed through the apparatus, the condenser is water chilled, and the round bottom flask is then heated to boiling (65° C.) causing methanol vapor to reflux/condense and wash the used catalyst in the thimble. The extraction is allowed to run about 8 hours a day for three days before shutting down and removing the washed and extracted catalyst. The washed catalyst powder (1.3 g) is recovered from the thimble, washed with deionized water, and air dried. The carbon content of the regenerated Catalyst 4C dropped from 3.9 wt. % to 2.4 wt. %. The Pd content measured at 0.06 wt. %. Phosphorus is not measured.

COMPARATIVE EXAMPLE 5

Catalyst Regeneration by Washing with Hydrogen Peroxide

Used Catalyst 2D (1.7 g) from Run 2D is placed into a 100 mL round bottom flask with a side-arm, followed by a hydrogen peroxide solution (30.5 g; 5.4 wt. % H2O2, 11.7 wt. % H2O, 83.3 wt. % MeOH) and deionized water (29.6 g). A water-cooled reflux condenser is attached to the top of the round bottom flask and a slight nitrogen purge is set through the flask and up the reflux column to an oil bubbler down stream. The solution is heated to reflux for 3 hours before cooling overnight, followed by 3 more hours of reflux and cooling. The solid is decanted from solution, washed with deionized water, and dried in a vacuum oven at 60° C. for 3 hours at sub-ambient pressure. Regenerated Catalyst 5 measured for 0.26 wt. % Pd, 0.06 wt. % Au 1.85 wt % carbon, and 0.11 wt % phosphorus (as phosphate).

EXAMPLE 6

Catalyst Regeneration by Washing, Calcination, and Reduction

Used Catalyst 2B (4.093 g) from Run 2B is placed in a 300 cc Parr bomb with de-ionized water (80 g), pure methanol (64 g), and a raised Teflon stir bar to prevent catalyst crushing while stirring. The Parr bomb is then depressured and then repressured six times with 100 psig house nitrogen to remove residual air, heated to 150° C. and stirred at 300 rpm for 24 hours, before cooling to room temperature and venting. The washed catalyst (designated Catalyst 6A) is then filtered and washed four times with deionized water using a 0.22 micron Millipore filter, air dried for 20 minutes before drying in a vacuum oven at 85° C., 25-30" water for 4 hours to give washed Catalyst 6A. The carbon content of washed Catalyst 6A dropped from 3.4 wt. % to 1.09 wt. %. The Pd content measured at 0.1 wt. %, the Au content measured at 0.02 wt. %, and phosphorus (as phosphate) measured at 0.02 wt. %.

Washed Catalyst 6A is further regenerated according to the procedure used for Regeneration 3A, except that it is heated from 22° C. to 110° C. at 10° C./min and held for 2 hours. All of the calcined solids are then reduced according to the same procedure used for Regeneration 3A, giving regenerated Catalyst 6B.

EXAMPLE 7

Propylene Epoxidation Procedure

The used (2A, 2B, 2C, and 2D) and regenerated catalysts (3A, 3B, 3C-1, 3C-2, 3D, 4A, 4B, 4C, 5, 6A, and 6B) are tested in propylene epoxidation according to the following general procedure.

A 300 cc stainless steel reactor is charged with 0.7 grams of catalyst, 13 grams of a buffer (0.1 M aqueous ammonium phosphate, pH=6), and 100 grams of methanol. The reactor is then charged to 300 psig of a feed consisting of 2% hydrogen, 4% oxygen, 5% propylene, 0.5% methane and the balance nitrogen (volume %). The pressure in the reactor is maintained at 300 psig via a back pressure regulator with the feed gases passed continuously through the reactor at 1600 cc/min (measured at 23° C. and one atmosphere pressure). In order to maintain a constant solvent level in the reactor during the run, the oxygen, nitrogen and propylene feeds are passed through a two-liter stainless steel vessel (saturator) preceding the reactor containing 1.5 liters of methanol. The reactor is stirred at 1500 rpm. The reaction mixture is heated to 60° C. and the gaseous effluent is analyzed by an online GC every hour and the liquid analyzed by offline GC at the end of the 18 hour run. Propylene oxide and equivalents, which include propylene oxide ("PO"), propylene glycol ("PG"), and glycol ethers, are produced during the reaction, in addition to propane formed by the hydrogenation of propylene. The results of the GC analyses are used to calculate the selectivities shown in Table 1.

The results show that a calcination and reduction regeneration of a used catalyst that has been exposed to buffer gives significantly lower propane selectivity compared to catalysts that are regenerated by a washing method. They also are significantly more selective than those regenerated with a hydrogen peroxide treatment such as demonstrated in Journal of Molecular Catalysis A: Chemical 117 (1997) 351-356 by Thiele et al. The improved propane selectivity demonstrates that the calcined and reduced regenerated catalysts produce significantly higher propylene oxide and equivalents ("POE") selectivity from propylene compared to catalysts that are regenerated by washing.

TABLE 1

COMPARISON OF CATALYST ACTIVITY FOLLOWING REGENERATION

| Catalyst | Treatment | Productivity[1] | PO/POE Selectivity (%)[2] | Propane Selectivity (%)[3] |
|---|---|---|---|---|
| 2A* | Recovered and dried | 0.18 | 93 | 18 |
| 3A | Calcined and reduced | 0.23 | 92 | 13 |
| 4A* | Washed and reduced | 0.22 | 93 | 38 |
| 2B* | Recovered and dried | 0.16 | 94 | 51 |
| 3B | Calcined and reduced | 0.22 | 92 | 27 |
| 4B* | Washed and reduced | 0.26 | 93 | 64 |
| 6A* | Washed | 0.26 | 93 | 77 |
| 6B | Washed, calcined, and reduced | 0.3 | 93 | 19 |
| 2C* | Recovered and dried | 0.12 | 93 | 10 |
| 3C-1* | Calcined only | 0.16 | 94 | 7 |
| 3C-2 | Calcined and reduced | 0.25 | 92 | 4 |
| 4C* | Washed | 0.14 | 94 | 26 |
| 2D* | Recovered and dried | 0.14 | 92 | 23 |
| 3D | Calcined and reduced | 0.24 | 91 | 15 |
| 5* | H2O2 treat, and reduced | 0.17 | 94 | 42 |

*Comparative Example
[1]Productivity = grams POE produced/gram of catalyst per hour.
[2]PO/POE Selectivity = moles PO/(moles PO + moles glycols + moles glycol ethers) * 100.
[3]Propane Selectivity = moles propane * 100/(moles POE + moles propane).

We claim:

1. A method of regenerating a used noble metal-containing titanium zeolite catalyst comprising the steps of:
   (a) heating the used catalyst at a temperature of at least 250° C. in the presence of a gas stream comprised of oxygen to obtain a heated product; and
   (b) reducing the heated product at a temperature of at least 20° C. in the presence of a gas stream comprised of hydrogen to form a reactivated catalyst;
   wherein the noble metal-containing titanium zeolite catalyst was used to catalyze the epoxidation of an olefin with hydrogen and oxygen in the presence of at least one reaction solvent and at least one buffer.

2. The method of claim 1 which comprises washing the used noble metal-containing titanium zeolite catalyst with a wash solvent prior to step (a).

3. The method of claim 2 wherein the wash solvent is selected from the group consisting of water, aliphatic alcohols, and mixtures thereof.

4. The method of claim 1 wherein the used catalyst is heated at a temperature greater than about 300° C.

5. The method of claim 1 wherein the gas stream comprised of oxygen is air.

6. The method of claim 1 wherein reduction step (b) is performed at a temperature of at least 30° C.

7. The method of claim 1 wherein the used noble metal-containing titanium zeolite catalyst comprises titanium silicalite and palladium.

8. The method of claim 1 wherein the used noble metal-containing titanium zeolite catalyst comprises titanium silicalite, palladium, and one or more metals selected from the group consisting of gold and platinum.

9. The method of claim 1 wherein the used noble metal-containing titanium zeolite catalyst comprises a palladium-containing titanium zeolite and a palladium-free titanium zeolite.

10. The method of claim 1 which comprises heating the used catalyst at a temperature of at least 250° C. in the absence of oxygen prior to step (a).

11. The method of claim 1 wherein the reaction solvent is selected from the group consisting of water, $C_1$-$C_4$ alcohols, supercritical $CO_2$, and mixtures thereof.

12. The method of claim 1 wherein the buffer comprises an anion and a cation, wherein the anion is selected from the group consisting of phosphate, carbonate, bicarbonate, carboxylate, citrate, borate, hydroxide, silicate, aluminosilicate, and mixtures thereof, and the cation is selected from the group consisting of ammonium, alkylammonium, alkali metal, alkaline earth metal, and mixtures thereof.

13. A method of regenerating a used noble metal-containing titanium zeolite catalyst comprising the steps of:
   (a) washing the used catalyst with a wash solvent;
   (b) heating the washed catalyst at a temperature of at least 300° C. in the presence of a gas stream comprised of oxygen to obtain a heated product; and
   (c) reducing the heated product of step (b) at a temperature of at least 30° C. in the presence of a gas stream comprised of hydrogen to form a reactivated catalyst;
   wherein the used noble metal-containing titanium zeolite catalyst was used to catalyze the epoxidation of an olefin with hydrogen and oxygen in the presence of at least one reaction solvent and at least one buffer.

14. The method of claim 13 wherein the wash solvent is selected from the group consisting of water, aliphatic alcohols, and mixtures thereof.

15. The method of claim 13 which comprises heating the washed catalyst at a temperature of at least 300° C. in the absence of oxygen prior to step (b).

16. The method of claim 13 wherein the used noble metal-containing titanium zeolite catalyst comprises titanium silicalite and palladium.

17. The method of claim 13 wherein the used noble metal-containing titanium zeolite catalyst comprises titanium silicalite, palladium, and one or more metals selected from the group consisting of gold and platinum.

18. The method of claim 13 wherein the used noble metal-containing titanium zeolite catalyst comprises a palladium-containing titanium zeolite and a palladium-free titanium zeolite.

* * * * *